United States Patent
Sun et al.

(10) Patent No.: US 12,224,829 B2
(45) Date of Patent: Feb. 11, 2025

(54) CSI REPORT ENHANCEMENT FOR HIGH-SPEED TRAIN SCENARIOS

(71) Applicant: APPLE INC., Cupertino, CA (US)

(72) Inventors: Haitong Sun, Cupertino, CA (US);
Chunxuan Ye, San Diego, CA (US);
Dawei Zhang, Cupertino, CA (US);
Hong He, Cupertino, CA (US);
Oghenekome Oteri, San Diego, CA (US); Wei Zeng, Cupertino, CA (US);
Weidong Yang, San Diego, CA (US);
Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,360

(22) PCT Filed: Aug. 5, 2021

(86) PCT No.: PCT/CN2021/110965
§ 371 (c)(1),
(2) Date: Sep. 16, 2021

(87) PCT Pub. No.: WO2023/010434
PCT Pub. Date: Feb. 9, 2023

(65) Prior Publication Data
US 2024/0039597 A1    Feb. 1, 2024

(51) Int. Cl.
*H04B 7/06*        (2006.01)
*H04W 84/00*       (2009.01)

(52) U.S. Cl.
CPC ....... *H04B 7/0626* (2013.01); *H04B 7/06968* (2023.05); *H04W 84/005* (2013.01)

(58) Field of Classification Search
None
See application file for complete search history.

(56) References Cited

U.S. PATENT DOCUMENTS

2017/0099175 A1    4/2017  Tian et al.
2017/0339714 A1*  11/2017  Harada ................. H04L 5/0012
(Continued)

FOREIGN PATENT DOCUMENTS

CN          101277278 A       10/2008
CN          102711199 A       10/2012
(Continued)

OTHER PUBLICATIONS

PCT/CN2021/110965, International Search Report and Written Opinion, Apr. 26, 2022, 10 pages.

*Primary Examiner* — Alpus Hsu
*Assistant Examiner* — Camquyen Thai
(74) *Attorney, Agent, or Firm* — Dorsey & Whitney LLP

(57) ABSTRACT

Configuring channel state information (CSI) reporting at a user equipment (UE) in a high speed train scenario may include, in response to being within range of a first transmission and reception point (TRP) of a plurality of TRPs associated with an HST, decoding a CSI reporting configuration communication received from a network. The CSI reporting configuration indicating that CSI reporting is to be performed in an HST scenario and being configured for the HST scenario. Measurements based on the decoded CSI reporting configuration received from the network may be performed. A CSI report communication associated with the HST scenario based on the measurements may be encoded for transmission to the network.

15 Claims, 5 Drawing Sheets

(56) References Cited

U.S. PATENT DOCUMENTS

| | | | |
|---|---|---|---|
| 2019/0081679 A1* | 3/2019 | Davydov | H04W 72/23 |
| 2021/0105217 A1* | 4/2021 | Saber | H04W 72/51 |
| 2022/0053544 A1* | 2/2022 | Kang | H04B 7/0626 |
| 2023/0216546 A1* | 7/2023 | Manolakos | H04L 5/0048 |
| | | | 370/329 |
| 2023/0246785 A1* | 8/2023 | Grossmann | H04L 5/0057 |
| | | | 370/329 |
| 2023/0291440 A1* | 9/2023 | Zhang | H04L 25/0222 |
| 2023/0344575 A1* | 10/2023 | Manolakos | H04L 25/0228 |
| 2023/0396300 A1* | 12/2023 | Hindy | H04B 7/0639 |

FOREIGN PATENT DOCUMENTS

| | | |
|---|---|---|
| JP | 2004088391 A | 3/2004 |
| WO | 2012155845 A1 | 11/2012 |
| WO | 2020250433 A1 | 12/2020 |

\* cited by examiner

CSI REPORT ENHANCEMENT FOR HIGH-SPEED TRAIN SCENARIOS

TECHNICAL FIELD

This application relates generally to wireless communication systems, including CSI report enhancements.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Figure 1:
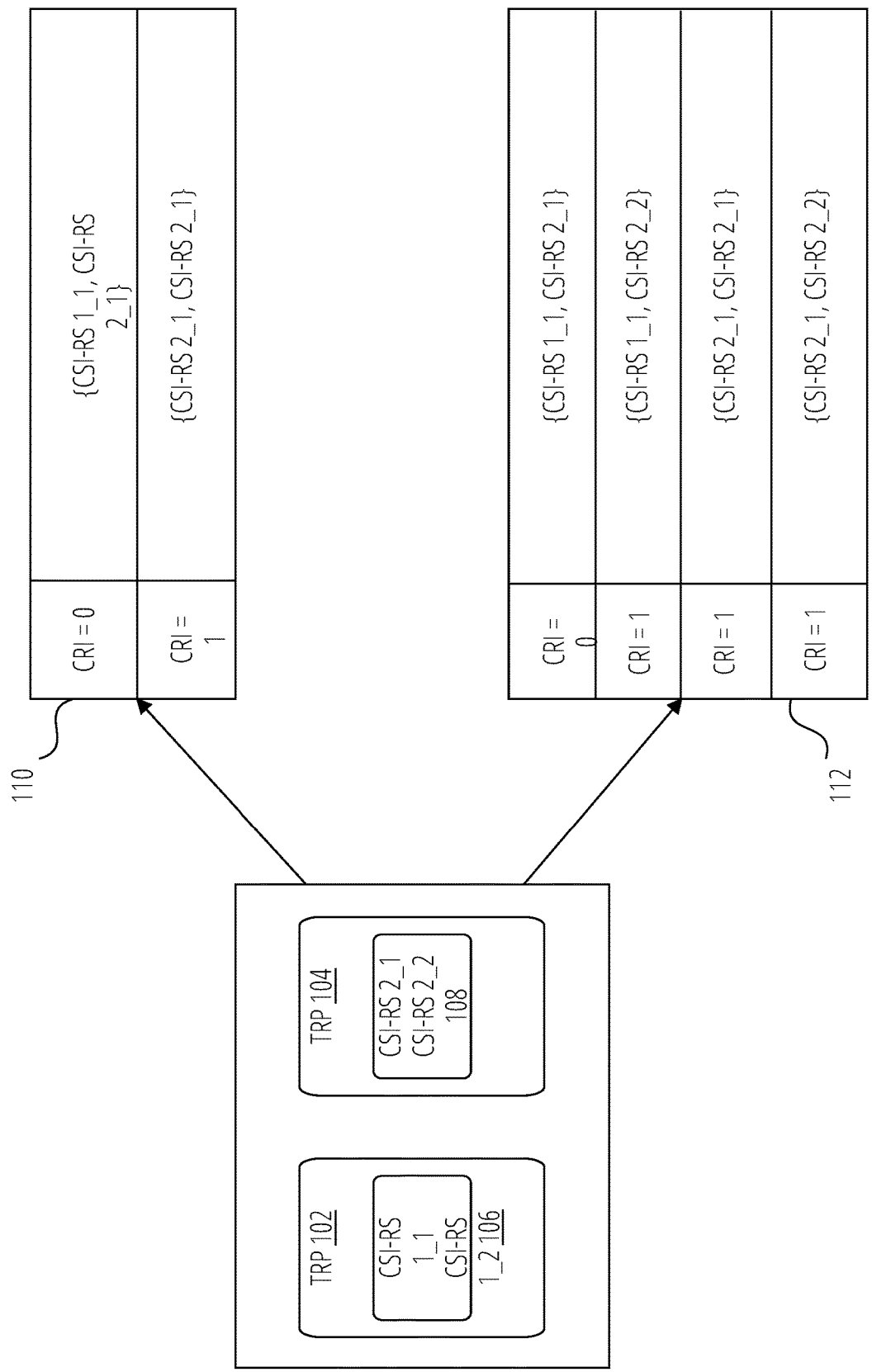
FIG. 1 illustrates an example of CRI reporting in accordance with some embodiments.

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

High Speed Train (HST) deployment scenarios provide a unique wireless environment. In particular, when a UE (e.g., a train or a mobile device of a user on a train) travels between two transmission/reception point (TRP) in HST scenarios, the UE may observe a very high positive Doppler shift from a first TRP and very high negative Doppler shift from a second TRP. As a result, the composite channel can vary quickly (e.g., approximately, or more than, 2 kilohertz (kHz)). Such scenarios may reduce channel capability or present challenges for a UE when trying to perform accurate channel estimation and date demodulation.

Currently, in 3GPP Release 17 (Rel-17), two modes of HST enhancement based on a Single Frequency Network (SFN) transmission are supported. The first mode comprises an HST-SFN without network (NW) pre-compensation. In such mode, physical downlink shared channel (PDSCH)/physical downlink control channel (PDCCH) (i.e., control resource set (CORESET)) is configured to quasi-co-locate (QCL) to two Tracking Resource Signals (TRSs). In addition, such mode may allow a UE to estimate two separate Doppler shift (i.e., one from each TRP) to assist in UE channel estimation. The second mode comprises HST-SFN with NW pre-compensation. In such mode, one PDSCH is configured to QCL with a "Doppler shift" property to one TRS and QCL without a "Doppler shift" property to the other TRS.

Current/previous Rel-17 HST enhancements focus on the design of the enhanced transmission schemes. However, to make such a system operate as efficiently as possible, a channel state information (CSI) enhancement is also important to ensure efficient Link Adaptation. In particular, the current/previous CSI enhancement does not consider an HST-SFN transmission, including: 1. For HST-SFN without NW pre-compensation, a different channel measurement resource (CMR) can come from a different TRP with a different Doppler shift; and 2. For HST-SFN with NW pre-compensation, a different CMR can come from a different TRP with different QCL properties.

Accordingly, the solutions provided herein address a CSI enhancement for HST scenarios, including: 1. An indication of CSI reporting for HST; 2. A CSI measurement resource configuration enhancement; 3. A CSI report quantity enhancement; 4. A CSI processing timeline consideration; and 5. A CPU occupation/active RS counting rule enhancement.

The first solution provided herein relates to indicating that CSI reporting is for HST and includes a number of different options and sub-options. In a first option regarding indicating CSI reporting is for HST, such indication can be explicitly configured by radio resource control (RRC) in a CSI-ReportConfig (i.e., a CSI report configuration). In some embodiments, the CSI-ReportConfig can include a new Information Element (IE) to indicate whether the CSI report is for: a. The HST-SFN mode without NW pre-compensation (HST scheme 1); or b. The HST-SFN mode with NW pre-compensation. In other embodiments, a new reportQuantity can be configured to support a special report quantity for HST enhancement (i.e., a new reportQuantity for HST-SFN mode without NW pre-compensation (HST scheme 1) or a new reportQuantity for HST-SFN mode with NW pre-compensation).

Certain restrictions can be further imposed when CSI reporting for HST is configured, including but not limited to, restrictions associated with: 1. The QCL configuration of the CSI-reference signal (RS); and/or 2. The report quantity configuration.

In a second option regarding indicating CSI reporting is for HST, such indication can be implicitly indicated by the QCL configuration of the CSI-RS for Channel Measurement Resource (CMR). Two sets of CSI-RS for CMR can be configured in the CSI-ReportConfig whether for HST-SFN mode without NW pre-compensation (HST scheme 1) or HST-SFN mode with NW pre-compensation.

For instance, for HST-SFN mode without NW pre-compensation (HST scheme 1), the first set of CSI-RS for CMR can be configured to be quasi-co-located to the first set of TRS with QCL-Type A (i.e., {Doppler shift, Doppler spread, average delay, delay spread}), as well as QCL-TypeD, if applicable. Similarly, the second set of CSI-RS for CMR may be configured to be quasi-co-located to the second set of TRS with QCL-Type A (i.e., {Doppler shift, Doppler spread, average delay, delay spread}), as well as QCL-TypeD, if applicable.

For HST-SFN mode with NW pre-compensation, the first set of CSI-RS for CMR can be configured quasi-co-located to the first set of TRS with QCL-Type A (i.e., {Doppler shift, Doppler spread, average delay, delay spread}), as well as QCL-TypeD, if applicable. In contrast, the second set of CSI-RS for CMR can be configured to be quasi-co-located to the second set of TRS with special QCL Type (i.e., {average delay, delay spread}), as well as QCL-TypeD, if applicable.

The second solution provided herein relates to a CSI measurement resource configuration enhancement for HST and includes a number of different options and sub-options. A first option for a CSI measurement configuration enhancement relates to a CMR configuration enhancement for HST. In particular, the first option includes two sets of CSI-RS that can be configured as described in the following sub-options: 1. A single Non-Zero Power-CSI-RS-ResourceSet (NZP-CSI-RS-ResourceSet) may be configured in a particular CSI-ReportConfig. CSI-RS resources in the single NZP-CSI-RS-ResourceSet may be configured to be divided into two groups, including: a. A first group that corresponds to the first TRP; and b. A second group that corresponds to the second TRP. The NW can further configure one or multiple pairs of CSI-RS resources for HST CSI reporting. In each such pair, the first CSI-RS may come from the first group of CSI-RS resources (i.e., corresponding to the first TRP) and the second CSI-RS may come from the second group of CSI-RS resources (i.e., corresponding to the second TRP); or 2. Two NZP-CSI-RS-ResourceSets may be configured in a particular CSI-ReportConfig. In such embodiments, the first NZP-CSI-RS-ResourceSet may correspond to the first TRP and the second NZP-CSI-RS-ResourceSet may correspond to the second TRP. The NW can further configure one or multiple pairs of CSI-RS resources for HST CSI reporting. In each such pair, the first CSI-RS may come from the first NZP-CSI-RS-ResourceSet (i.e., corresponding to the first TRP) and the second CSI-RS may come from the second NZP-CSI-RS-ResourceSet (i.e., corresponding to the second TRP).

A second option for a CSI measurement configuration enhancement also relates to a CMR configuration enhancement for HST, in which two sets of CSI-RS may each be configured to correspond to a different TRP. For HST-SFN mode without NW pre-compensation (HST scheme 1), the first set of CSI-RS for CMR can be configured to be quasi-co-located to the first set of TRS with QCL-Type A (i.e., {Doppler shift, Doppler spread, average delay, delay spread}), as well as QCL-TypeD, if applicable. Similarly, the second set of CSI-RS for CMR can be configured to be quasi-co-located to the second set of TRS with QCL-Type A (i.e., {Doppler shift, Doppler spread, average delay, delay spread}), as well as QCL-TypeD, if applicable. For HST-SFN mode with NW pre-compensation, the first set of CSI-RS for CMR can be configured to be quasi-co-located to the first set of TRS with QCL-Type A (i.e., {Doppler shift, Doppler spread, average delay, delay spread}), as well as QCL-TypeD, if applicable. In contrast, the second set of CSI-RS for CMR can be configured to be quasi-co-located to the second set of TRS with special QCL Type (i.e., {average delay, delay spread}), as well as QCL-TypeD, if applicable. As an example, the following may be applicable:

```
NZP-CSI-RS-Resource ::=      SEQUENCE {
  nzp-CSI-RS-ResourceID        NZP-CSI-RS-ResourceID,
  resourceMapping              CSI-RS-ResourceMapping,
  powerControlOffset           INTEGER (-8... 15),
  powerControlOffsetSS         ENUMERATED{db-3, db0, db3, db6}
  scramblingID                 ScramblingId,
  periodicityAndOffset         CSI-ResourcePeriodicityAndOffset
  qcl-InfoPeriodicCSI-RS       TCI-StateId
  ...
}
```

Notably, by way of background, NR currently includes support for two types of Interference Measurement Resources (IMRs): 1. Non Zero Power IMRs (NZP-IMRs), which uses NZP-CSI-RS resources; and 2. Zero Power IMRs (ZP-IMRs), which use CSI-IM resources.

Accordingly, a third option for a CSI measurement configuration enhancement relates to an IMR configuration enhancement for HST, in which the following three options may apply: 1. NZP-IMR/ZP-IMR may not be configured; 2. NZP-IMR/ZP-IMR can be configured and are one-to-one mapped to each CSI Resource Indicator (CRI) hypothesis including either a single CSI-RS from either TRP or a pair of CSI-RS from both TRPs; or 3. NZP-IMR/ZP-IMR can be configured and only a single NZP-IMR/ZP-IMR is configured across both TRPs or per TRP. When multiple CSI-RS are configured as CMR for a TRP, a given UE implementation may be used to determine which QCL assumption is used to receive the NZP-IMR/ZP-IMR. In addition, independent solutions may be adopted for NZP-IMR and ZP-IMR, in some embodiments.

The third solution provided herein relates to a CSI report quantity enhancement for HST and includes a number of different options and sub-options. A first option for a CSI report quantity enhancement relates to CRI reporting when pairs of CSI-RS resources are not configured and includes the following sub-options: a. Two independent CRI can be reported, in which the first CRI indexes into the first set of CSI-RS resources and the second CRI indexes into the second set of CSI-RS resources; or b. A single CRI can be reported, which may include: i. The CRI being applied to both sets of CSI-RS resources independently; or ii. Allowing joint encoding of CRI.

FIG. 1 illustrates two options for a single CRI as discussed with respect to sub-option b of the first option of the third solution. As shown, FIG. 1 includes a TRP 102 having CSI-RS resource set 106 (i.e., CSI-RS 1_1 and CSI-RS 1_2) and a TRP 104 having CSI-RS resource set 108 (i.e., CSI-RS 2_1 and CSI-RS 2_2). In addition, FIG. 1 includes a single CRI report 110, which includes the CRI being applied to both sets of CSI-RS resources (i.e., CSI-RS resource set 106 and CSI-RS resource set 108) independently (i.e., sub-option bi of the first option of the third solution) and a single CRI report 112, which includes the single CRI being applied to both sets of CSI-RS resources using joint encoding (i.e., sub-option bii of the first option of the third solution).

A second option for a CSI report quantity enhancement relates to CRI reporting when two sets of CSI-RS resources are configured separately for each TRP. In such embodiments, each CRI may index into the corresponding set of CSI-RS resources configured for each TRP. The base station (e.g., gNB) can further configure a restriction on CRI combinations that the UE can report, which can reduce both processing complexity for the UE and CRI overhead.

Figure 2:
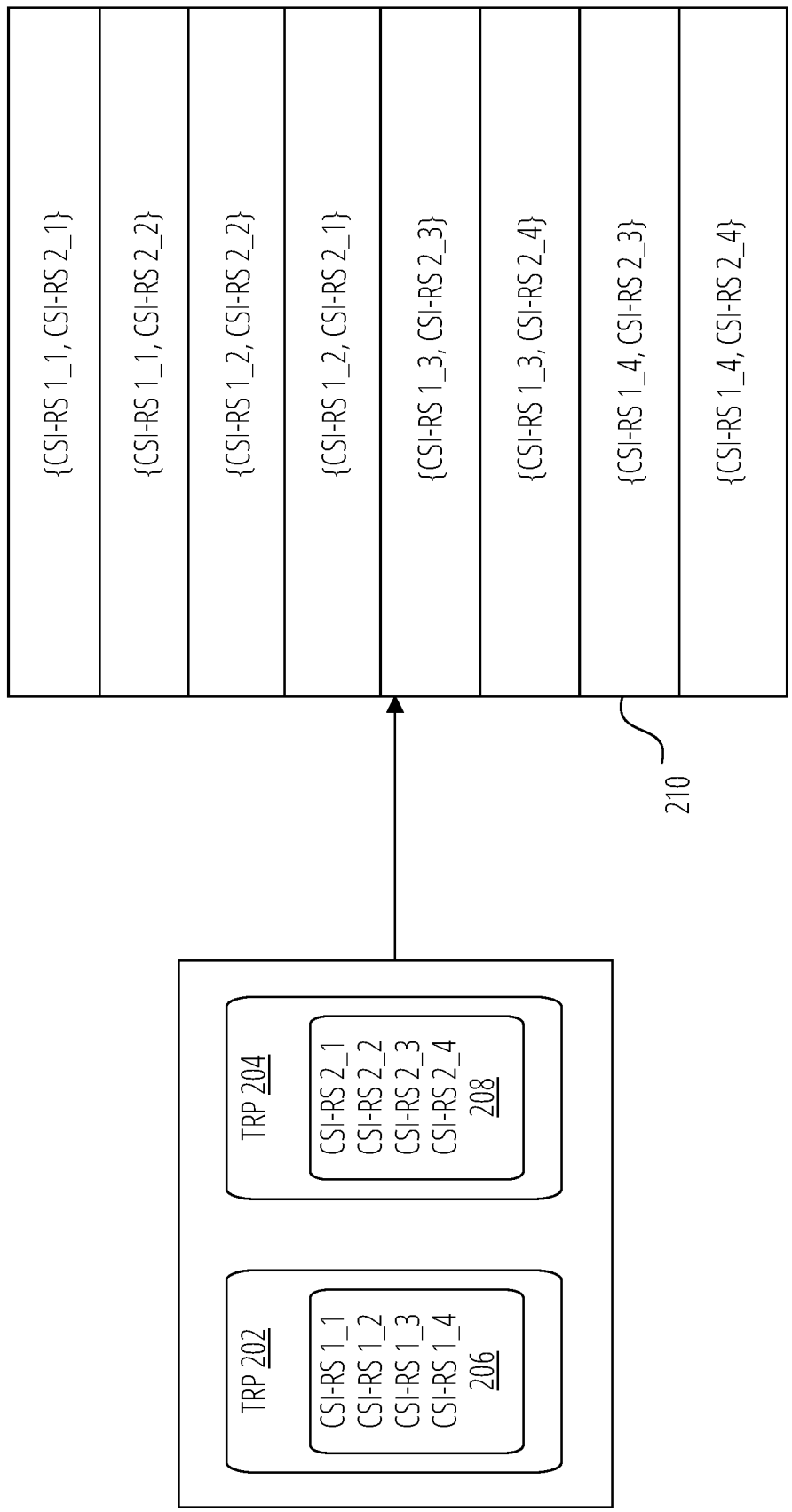
FIG. 2 illustrates an example of CRI reporting in accordance with some embodiments.

FIG. 2 illustrates an example of CRI reporting when two sets of CSI-RS resources are configured separately for each TRP. As shown, FIG. 2 includes a TRP 202 having CSI-RS resource set 206 (i.e., CSI-RS 1_1, CSI-RS 1_2, CSI-RS 1_3, and CSI-RS 1_4) and a TRP 204 having CSI-RS resource set 208 (i.e., CSI-RS 2_1, CSI-RS 2_2, CSI-RS 2_3, and CSI-RS 2_4). In addition, FIG. 2 includes a CRI report 210, which includes CSI-RS resources configured separately for each TRP and each CRI indexing into a corresponding set of CSI-RS resources configured for each TRP.

A third option for a CSI report quantity enhancement relates to channel quality indicator (CQI) reporting, which may allow for a single CQI to be reported. A fourth option for a CSI report quantity enhancement relates to Rank Indicator (RI) reporting, which may allow for a single RI to be reported. A fifth option for a CSI report quantity enhancement relates to Precoding Matrix Indicator (PMI) reporting, which may allow for two PMIs to be reported (each PMI corresponding to a different TRP). A sixth option for a CSI report quantity enhancement relates to Layer Indicator (LI) reporting, which may allow for two options, including: 1. One LI being reported (the same for both TRPs); or 2. Two LIs being reported, in which each LI corresponds to a different TRP.

The fourth solution provided herein relates to a CSI processing timeline consideration for HST and includes a number of different options and sub-options. In a first option, for periodic and semi-persistent CSI reporting, a relaxed timeline can be hardcoded within the specification in the 5.2.2.5 CSI reference resource definition described in 3GPP TS 38.514. Similarly, for Aperiodic CSI reporting, a relaxed timeline can be hardcoded as Z and Z' Table in the specification in 5.4 UE CSI computation time described in 3GPP TS 38.514. In such embodiments, a new table may be created or an existing table with different mapping can be used.

In a second option related to a CSI processing timeline consideration for HST, a UE may report an applicable time relaxation via RRC as a UE capability. The same, or a different, timeline relaxation can also be reported for persistent/semi-persistent-CSI (P/SP-CSI) and aperiodic-CSI (AP-CSI).

The fifth solution provided herein relates to a CSI Processing Unit occupation/active CSI-RS counting rule enhancement for HST and includes a number of different options and sub-options. When two set of CSI-RS resources are configured, and potentially, one or more pairs of CSI-RS resources are configured, the following may apply: 1. For each TRP hypothesis, CSI-PU and active CSI-RS are counted independently; and 2. For each multi-TRP hypothesis, CSI-PU and active CSI-RS are counted independently for each CSI-RS in the multi-TRP hypothesis (e.g., when a multi-TRP hypothesis contains two CSI-RS, it is counted as 2 instead of 1).

Figure 3:
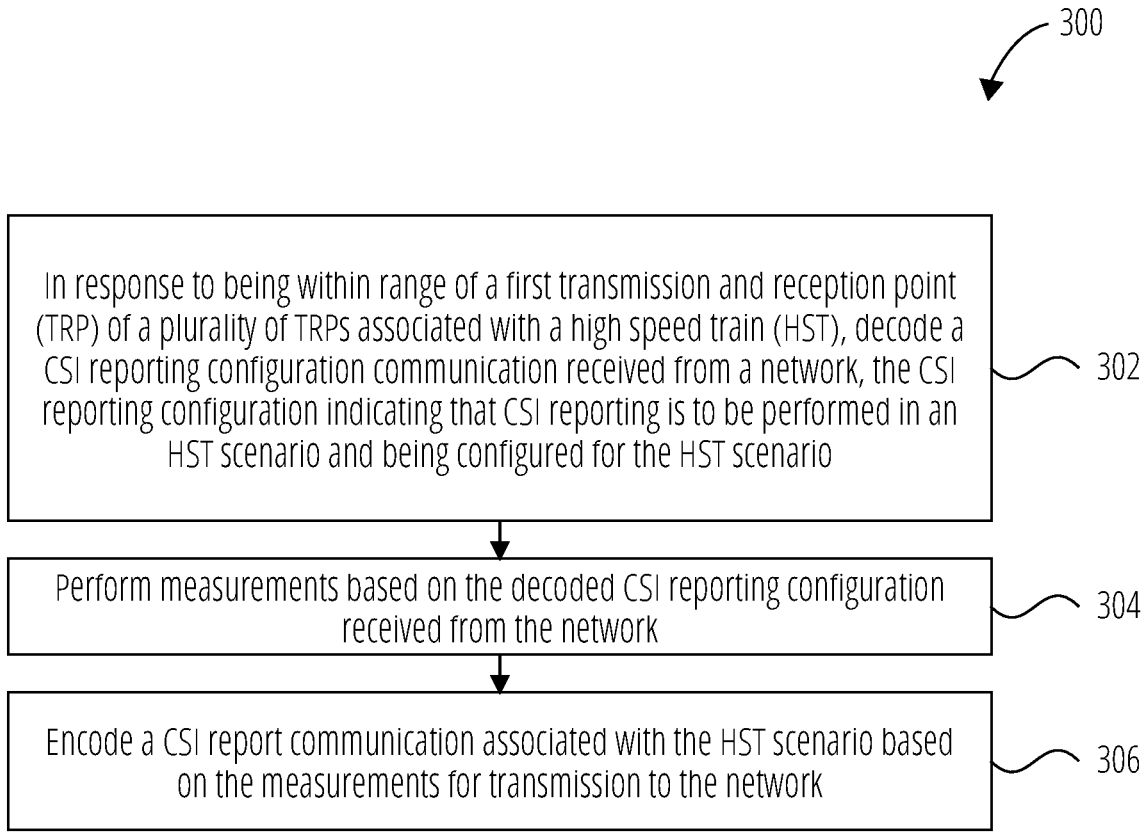
FIG. 3 illustrates a flowchart of a method for configuring channel CSI reporting at a UE in accordance with some embodiments.

FIG. 3 illustrates a flowchart of a method 300 for configuring CSI reporting in an HST scenario. In 302, the method 300, in response to being within range of a first transmission and reception point (TRP) of a plurality of TRPs associated with a high speed train (HST), decodes a CSI reporting configuration communication received from a network. The CSI reporting configuration may indicate that CSI reporting is to be performed in a high speed train (HST) scenario and may be configured for the HST scenario.

In 304, the method 300 performs measurements based on the decoded CSI reporting configuration received from the network. For instance, such measurements may be related to channel measurements, interference measurements, and so forth. In 306, the method 300 encodes a CSI report communication associated with the HST scenario based on the measurements for transmission to the network. For example, the UE may perform measurements corresponding to the received CSI report configuration information and send such measurements to the corresponding network.

The method 300 may further include the CSI reporting configuration being configured via radio resource control (RRC) and explicitly indicating the HST scenario. The method 300 may further include the CSI reporting configuration including a new information element (IE) that indicates whether the CSI reporting configuration is associated with HST-single frequency network (HST-SFN) without network pre-compensation mode or HST-SFN with network pre-compensation mode. The method 300 may further include the CSI reporting configuration including a new reportQuantity that is configured to support the HST scenario.

The method 300 may further include the CSI reporting configuration implicitly indicating the HST scenario based on a quasi-co-location (QCL) configuration of CSI-reference signals (CSI-RSs) for a channel measurement resource (CMR). The method 300 may also include the CSI-RSs for the CMR including a first set of CSI-RSs and a second set of CSI-RSs. The method 300 may further include, when the first and second sets of CSI-RSs are configured for HST-single frequency network (HST-SFN) without network pre-compensation mode, the first set of CSI-RSs being configured to be quasi-co-located to a first set of tracking resource signals (TRSs) with quasi-co-location-Type A (QCL-Type A) and the second set of CSI-RSs being configured to be quasi-co-located to a second set of TRSs with QCL-Type A, and when the first and second sets of CSI-RSs are configured for HST-SFN with network pre-compensation mode, the first set of CSI-RSs being configured to be quasi-co-located to a first set of TRSs with QCL-Type A and the second set of CSI-RSs being configured to be quasi-co-located to a second set of TRSs with a special QCL type including at least an average delay and a delay spread.

The method 300 may further include the CSI reporting configuration including a single non-zero power-CSI-reference signal (NZP-CSI-RS) resource set associated with a channel measurement resource (CMR). A first portion of the single NZP-CSI-RS resource set may correspond to the first TRP and a second portion of the single NZP-CSI-RS resource set may correspond to a second TRP of the plurality of TRPs.

The method 300 may also include the CSI reporting configuration including a first non-zero power-CSI-reference signal (NZP-CSI-RS) resource set associated with a channel measurement resource (CMR) and a second NZP-CSI-RS resource set associated with the CMR. The first NZP-CSI-RS resource set may correspond to the first TRP and the second NZP-CSI-RS resource set may correspond to a second TRP of the plurality of TRPs.

The method 300 may further include two sets of CSI-reference signals (CSI-RSs) that are associated with a channel measurement resource (CMR). A first set of the two sets of CSI-RSs may correspond to the first TRP and a second set of the two sets of CSI-RSs may correspond to a second TRP. In addition, when the first set and the second set are configured for HST-single frequency network (HST-SFN) without network pre-compensation mode, the first set is configured to be quasi-co-located to a first set of tracking resource signals (TRSs) with quasi-co-location-Type A (QCL-Type A) and the second set of CSI-RSs is configured to be quasi-co-located to a second set of TRSs with QCL-Type A. Furthermore, when the first set and the second set are configured for HST-SFN with network pre-compensation mode, the first set is configured to be quasi-co-located to the first set of TRSs with QCL-Type A and the second set is configured to be quasi-co-located to the second set of TRSs with a special QCL type including at least an average delay and a delay spread.

The method 300 may further include the CSI reporting configuration including non-zero power-interference measurement resources (NZP-IMRs) or zero-power-IMRs (ZP-IMRs). The method 300 may further include the CSI reporting configuration including a CSI resource indicator (CRI) configuration that comprises two independent CRIs to be reported. A first CRI of the two independent CRIs may index into a first set of CSI-reference signal (CSI-RS) resources and a second CRI of the two independent CRIs may index into a second set of CSI-RS resources.

The method 300 may further include the CSI reporting configuration including a CSI resource indicator (CRI) configuration that comprises a single CRI being reported. The single CRI may be applied to two sets of CSI-reference signal (CSI-RS) resources independently or the single CRI may be applied to the two sets of CSI-RS resources using joint encoding.

The method 300 may further include the CSI reporting configuration including a CSI resource indicator (CRI) configuration. When a first set of CSI-reference signal (CSI-RS) resources is configured for the first TRP and a second set of CSI-RS resources is configured separately for a second TRP of the plurality of TRPs, a first CRI associated with the first TRP and the first set of CSI-RS resources may index into the CSI-RS resources configured for the first TRP and a second CRI associated with the second TRP and the second set of CSI-RS resources may index into the CSI-RS resources configured for the second TRP.

The method 300 may further include the CSI report communication including at least one of: a single channel quality indicator (CQI), a single rank indicator (RI), a first precoding matrix indicator (PMI) corresponding to the first TRP and a second PMI corresponding to a second TRP of the plurality of TRPs, one layer indicator (LI) corresponding to the first TRP and the second TRP, or a first LI corresponding to the first TRP and a second LI corresponding to the second TRP.

The method may further comprise encoding a UE capability message that includes a time relaxation value associated with CSI processing in the HST scenario.

Embodiments contemplated herein include an apparatus comprising means to perform one or more elements of the method 300. This apparatus may be, for example, an apparatus of a UE (such as a wireless device 502 that is a UE, as described herein).

Embodiments contemplated herein include one or more non-transitory computer-readable media comprising instructions to cause an electronic device, upon execution of the instructions by one or more processors of the electronic device, to perform one or more elements of the method 300. This non-transitory computer-readable media may be, for example, a memory of a UE (such as a memory 506 of a wireless device 502 that is a UE, as described herein).

Embodiments contemplated herein include an apparatus comprising logic, modules, or circuitry to perform one or more elements of the method 300. This apparatus may be, for example, an apparatus of a UE (such as a wireless device 502 that is a UE, as described herein).

Embodiments contemplated herein include an apparatus comprising: one or more processors and one or more computer-readable media comprising instructions that, when executed by the one or more processors, cause the one or more processors to perform one or more elements of the method 300. This apparatus may be, for example, an apparatus of a UE (such as a wireless device 502 that is a UE, as described herein).

Embodiments contemplated herein include a signal as described in or related to one or more elements of the method 300.

Embodiments contemplated herein include a computer program or computer program product comprising instructions, wherein execution of the program by a processor is to cause the processor to carry out one or more elements of the method 300. The processor may be a processor of a UE (such as a processor(s) 504 of a wireless device 502 that is a UE, as described herein). These instructions may be, for example, located in the processor and/or on a memory of the UE (such as a memory 506 of a wireless device 502 that is a UE, as described herein).

Figure 4:
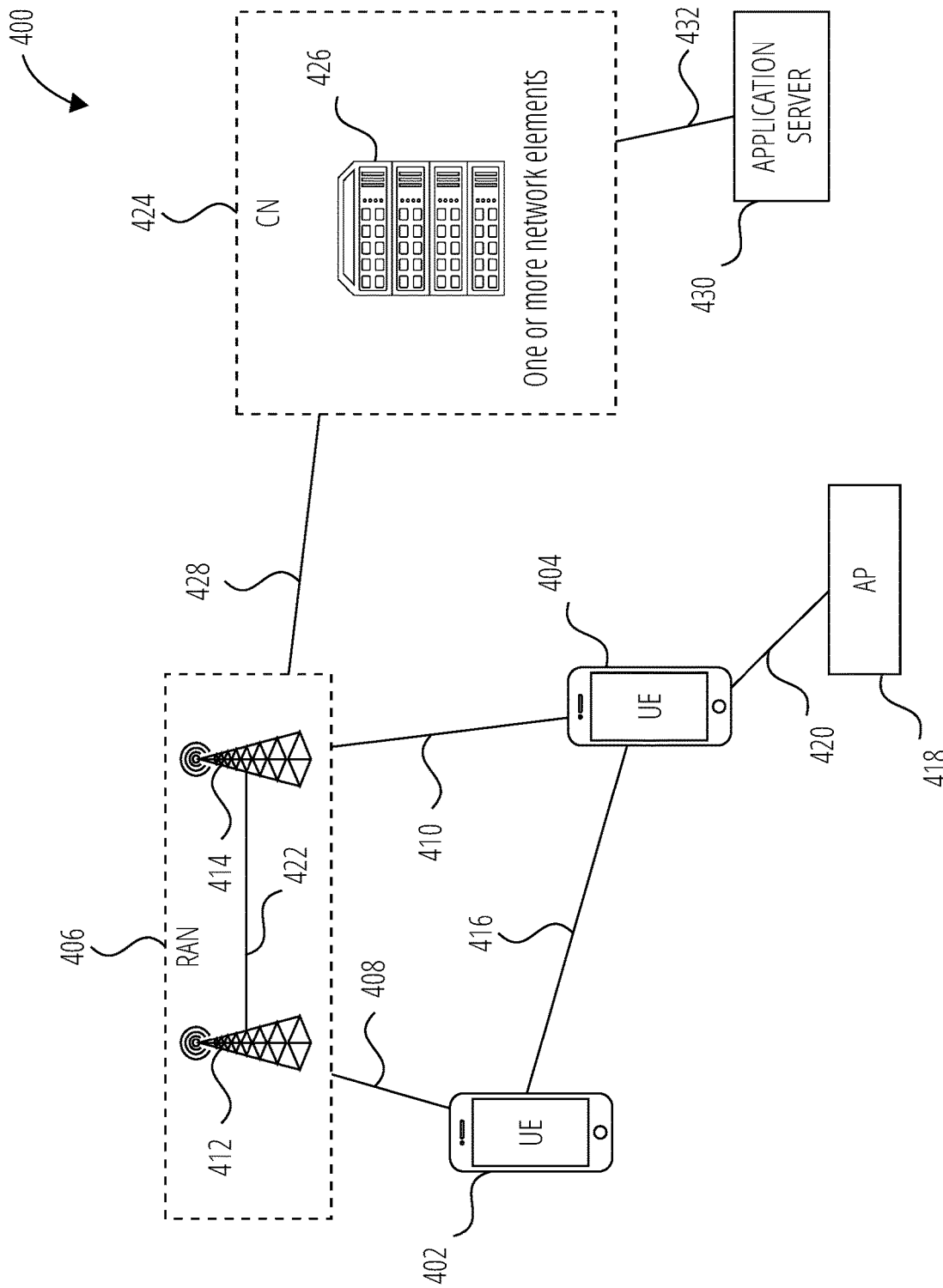
FIG. 4 illustrates an example architecture of a wireless communication system, according to embodiments disclosed herein.

FIG. 4 illustrates an example architecture of a wireless communication system 400, according to embodiments disclosed herein. The following description is provided for an example wireless communication system 400 that operates in conjunction with the LTE system standards and/or 5G or NR system standards as provided by 3GPP technical specifications.

As shown by FIG. 4, the wireless communication system 400 includes UE 402 and UE 404 (although any number of UEs may be used). In this example, the UE 402 and the UE 404 are illustrated as smartphones (e.g., handheld touchscreen mobile computing devices connectable to one or more cellular networks), but may also comprise any mobile or non-mobile computing device configured for wireless communication.

The UE 402 and UE 404 may be configured to communicatively couple with a RAN 406. In embodiments, the RAN 406 may be NG-RAN, E-UTRAN, etc. The UE 402 and UE 404 utilize connections (or channels) (shown as connection 408 and connection 410, respectively) with the RAN 406, each of which comprises a physical communications interface. The RAN 406 can include one or more base stations, such as base station 412 and base station 414, that enable the connection 408 and connection 410.

In this example, the connection 408 and connection 410 are air interfaces to enable such communicative coupling, and may be consistent with RAT(s) used by the RAN 406, such as, for example, an LTE and/or NR.

In some embodiments, the UE 402 and UE 404 may also directly exchange communication data via a sidelink interface 416. The UE 404 is shown to be configured to access an access point (shown as AP 418) via connection 420. By way of example, the connection 420 can comprise a local wireless connection, such as a connection consistent with any IEEE 802.11 protocol, wherein the AP 418 may comprise a Wi-Fi® router. In this example, the AP 418 may be connected to another network (for example, the Internet) without going through a CN 424.

In embodiments, the UE 402 and UE 404 can be configured to communicate using orthogonal frequency division multiplexing (OFDM) communication signals with each other or with the base station 412 and/or the base station 414 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 412 or base station 414 may be implemented as one or more software entities running on server computers as part of a virtual network. In addition, or in other embodiments, the base station 412 or base station 414 may be configured to communicate with one another via interface 422. In embodiments where the wireless communication system 400 is an LTE system (e.g., when the CN 424 is an EPC), the interface 422 may be an X2 interface. The X2 interface may be defined between two or more base stations (e.g., two or more eNBs and the like) that connect to an EPC, and/or between two eNBs connecting to the EPC. In embodiments where the wireless communication system 400 is an NR system (e.g., when CN 424 is a 5GC), the interface 422 may be an Xn interface. The Xn interface is defined between two or more base stations (e.g., two or more gNBs and the like) that connect to 5GC, between a base station 412 (e.g., a gNB) connecting to 5GC and an eNB, and/or between two eNBs connecting to 5GC (e.g., CN 424).

The RAN 406 is shown to be communicatively coupled to the CN 424. The CN 424 may comprise one or more network elements 426, which are configured to offer various data and telecommunications services to customers/subscribers (e.g., users of UE 402 and UE 404) who are connected to the CN 424 via the RAN 406. The components of the CN 424 may be implemented in one physical device or separate physical devices including components to read and execute instructions from a machine-readable or computer-readable medium (e.g., a non-transitory machine-readable storage medium).

In embodiments, the CN 424 may be an EPC, and the RAN 406 may be connected with the CN 424 via an S1 interface 428. In embodiments, the S1 interface 428 may be split into two parts, an S1 user plane (S1-U) interface, which carries traffic data between the base station 412 or base station 414 and a serving gateway (S-GW), and the S1-MME interface, which is a signaling interface between the base station 412 or base station 414 and mobility management entities (MMEs).

In embodiments, the CN 424 may be a 5GC, and the RAN 406 may be connected with the CN 424 via an NG interface 428. In embodiments, the NG interface 428 may be split into two parts, an NG user plane (NG-U) interface, which carries traffic data between the base station 412 or base station 414 and a user plane function (UPF), and the S1 control plane (NG-C) interface, which is a signaling interface between the base station 412 or base station 414 and access and mobility management functions (AMFs).

Generally, an application server 430 may be an element offering applications that use internet protocol (IP) bearer resources with the CN 424 (e.g., packet switched data services). The application server 430 can also be configured to support one or more communication services (e.g., VoIP sessions, group communication sessions, etc.) for the UE 402 and UE 404 via the CN 424. The application server 430 may communicate with the CN 424 through an IP communications interface 432.

Figure 5:
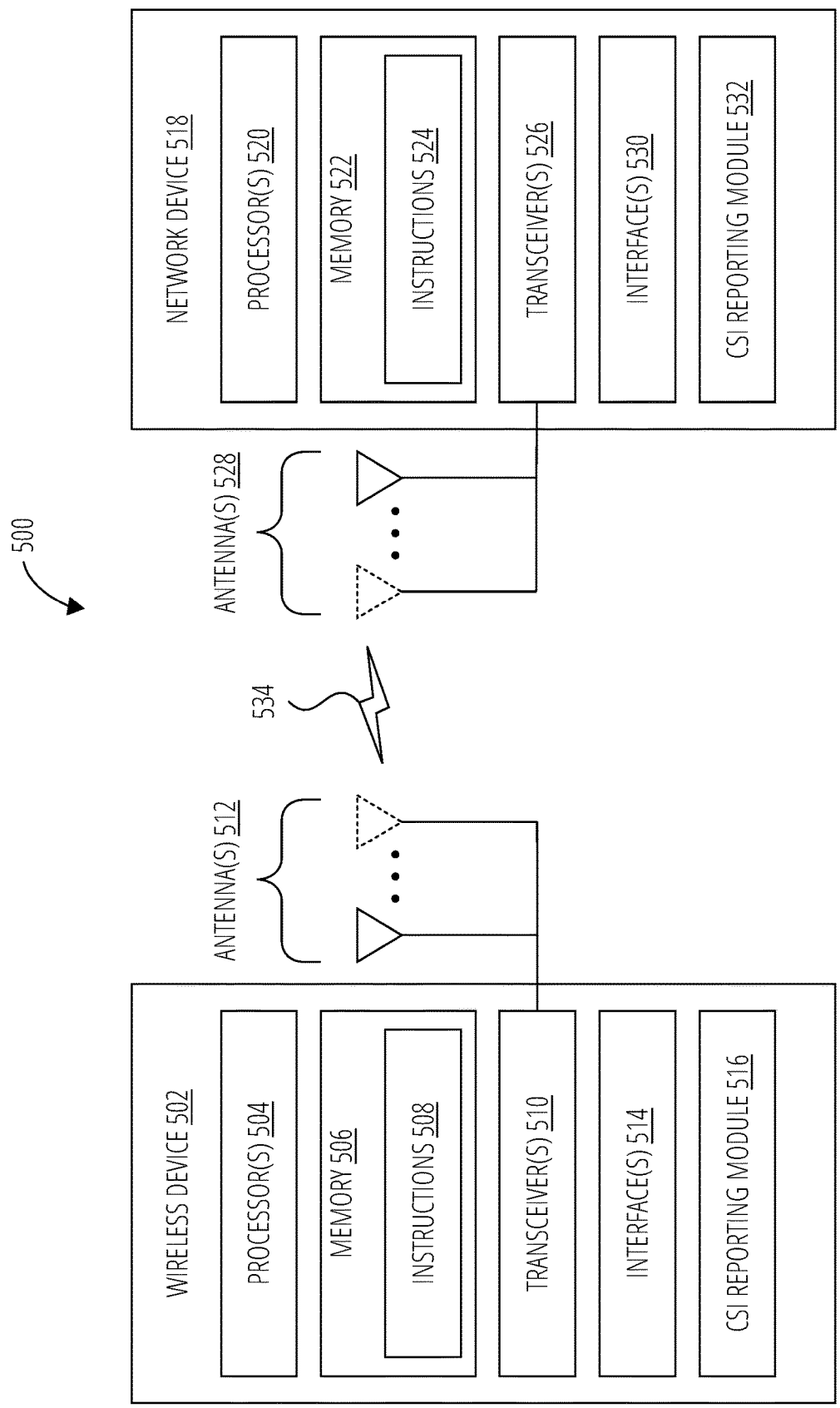
FIG. 5 illustrates a system for performing signaling between a wireless device and a network device, according to embodiments disclosed herein.

FIG. 5 illustrates a system 500 for performing signaling 534 between a wireless device 502 and a network device 518, according to embodiments disclosed herein. The system 500 may be a portion of a wireless communications system as herein described. The wireless device 502 may be, for example, a UE of a wireless communication system. The network device 518 may be, for example, a base station (e.g., an eNB or a gNB) of a wireless communication system.

The wireless device 502 may include one or more processor(s) 504. The processor(s) 504 may execute instructions such that various operations of the wireless device 502 are performed, as described herein. The processor(s) 504 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 502 may include a memory 506. The memory 506 may be a non-transitory computer-readable storage medium that stores instructions 508 (which may include, for example, the instructions being executed by the processor(s) 504). The instructions 508 may also be referred to as program code or a computer program. The memory 506 may also store data used by, and results computed by, the processor(s) 504.

The wireless device 502 may include one or more transceiver(s) 510 that may include radio frequency (RF) transmitter and/or receiver circuitry that use the antenna(s) 512 of the wireless device 502 to facilitate signaling (e.g., the signaling 534) to and/or from the wireless device 502 with other devices (e.g., the network device 518) according to corresponding RATs.

The wireless device 502 may include one or more antenna(s) 512 (e.g., one, two, four, or more). For embodiments with multiple antenna(s) 512, the wireless device 502 may leverage the spatial diversity of such multiple antenna(s) 512 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 502 may be accomplished according to precoding (or digital beamforming) that is applied at the wireless device 502 that multiplexes the data streams across the antenna(s) 512 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 502 may implement analog beamforming techniques, whereby phases of the signals sent by the antenna(s) 512 are relatively adjusted such that the (joint) transmission of the antenna(s) 512 can be directed (this is sometimes referred to as beam steering).

The wireless device 502 may include one or more interface(s) 514. The interface(s) 514 may be used to provide input to or output from the wireless device 502. For example, a wireless device 502 that is a UE may include interface(s) 514 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver(s) 510/antenna(s) 512 already described) that allow for communication between the UE and other devices and may operate according to known protocols (e.g., Wi-Fi®, Blu-etooth®, and the like).

The wireless device 502 may include a CSI reporting module 516. The CSI reporting module 516 may be implemented via hardware, software, or combinations thereof. For example, the CSI reporting module 516 may be implemented as a processor, circuit, and/or instructions 508 stored in the memory 506 and executed by the processor(s) 504. In some examples, the CSI reporting module 516 may be integrated within the processor(s) 504 and/or the transceiver(s) 510. For example, the CSI reporting module 516 may be implemented by a combination of software components (e.g., executed by a DSP or a general processor) and hardware components (e.g., logic gates and circuitry) within the processor(s) 504 or the transceiver(s) 510.

The CSI reporting module 516 may be used for various aspects of the present disclosure, for example, aspects of FIGS. 1-3. The CSI reporting module 516 is configured to assist in identifying the applicability of an HST scenario and performing appropriate CSI measurements and reporting associated with the HST scenario.

The network device 518 may include one or more processor(s) 520. The processor(s) 520 may execute instructions such that various operations of the network device 518 are performed, as described herein. The processor(s) 504 may include one or more baseband processors implemented using, for example, a CPU, a DSP, an ASIC, a controller, an FPGA device, another hardware device, a firmware device, or any combination thereof configured to perform the operations described herein.

The network device 518 may include a memory 522. The memory 522 may be a non-transitory computer-readable storage medium that stores instructions 524 (which may include, for example, the instructions being executed by the processor(s) 520). The instructions 524 may also be referred to as program code or a computer program. The memory 522 may also store data used by, and results computed by, the processor(s) 520.

The network device 518 may include one or more transceiver(s) 526 that may include RF transmitter and/or receiver circuitry that use the antenna(s) 528 of the network device 518 to facilitate signaling (e.g., the signaling 534) to and/or from the network device 518 with other devices (e.g., the wireless device 502) according to corresponding RATs.

The network device 518 may include one or more antenna(s) 528 (e.g., one, two, four, or more). In embodiments having multiple antenna(s) 528, the network device 518 may perform MIMO, digital beamforming, analog beamforming, beam steering, etc., as has been described.

The network device 518 may include one or more interface(s) 530. The interface(s) 530 may be used to provide input to or output from the network device 518. For example, a network device 518 that is a base station may include interface(s) 530 made up of transmitters, receivers, and other circuitry (e.g., other than the transceiver(s) 526/antenna(s) 528 already described) that enables the base station to communicate with other equipment in a core network, and/or that enables the base station to communicate with external networks, computers, databases, and the like for purposes of operations, administration, and maintenance of the base station or other equipment operably connected thereto.

The network device 518 may include a CSI reporting module 532. The CSI reporting module 532 may be implemented via hardware, software, or combinations thereof. For example, the CSI reporting module 532 may be implemented as a processor, circuit, and/or instructions 524 stored in the memory 522 and executed by the processor(s) 520. In some examples, the CSI reporting module 532 may be integrated within the processor(s) 520 and/or the transceiver(s) 526. For example, the CSI reporting module 532 may be implemented by a combination of software components (e.g., executed by a DSP or a general processor) and hardware components (e.g., logic gates and circuitry) within the processor(s) 520 or the transceiver(s) 526.

The CSI reporting module 532 may be used for various aspects of the present disclosure, for example, aspects of FIGS. 1-3. The CSI reporting module 532 is configured to identify the applicability of an HST scenario and configure UEs to perform proper CSI reporting associated with the HST scenario.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for configuring channel state information (CSI) reporting at a user equipment (UE), the method comprising:
in response to being within range of a first transmission and reception point (TRP) of a plurality of TRPs associated with a high speed train (HST), decoding a CSI reporting configuration communication received from a network, the CSI reporting configuration indicating that CSI reporting is to be performed in an HST scenario and being configured for the HST scenario;
performing measurements based on the decoded CSI reporting configuration received from the network; and
encoding a CSI report communication associated with the HST scenario based on the measurements for transmission to the network,
wherein two sets of CSI-reference signals (CSI-RSs) are associated with a channel measurement resource (CMR), a first set of the two sets of CSI-RSs corresponding to the first TRP and a second set of the two sets of CSI-RSs corresponding to a second TRP, wherein when:
the first set and the second set are configured for HST-single frequency network (HST-SFN) without network pre-compensation mode, the first set is configured to be quasi-co-located to a first set of tracking resource signals (TRSs) with quasi-co-location-Type A (QCL-Type A) and the second set of CSI-RSs is configured to be quasi-co-located to a second set of TRSs with QCL-Type A, and
when the first set and the second set are configured for HST-SFN with network pre-compensation mode, the first set is configured to be quasi-co-located to the first set of TRSs with QCL-Type A and the second set is configured to be quasi-co-located to the second set of TRSs with a special QCL type including at least an average delay and a delay spread.

2. The method of claim 1, wherein the CSI reporting configuration is configured via radio resource control (RRC) and explicitly indicates the HST scenario.

3. The method of claim 2, wherein the CSI reporting configuration includes a new information element that indicates whether the CSI reporting configuration is associated with the HST-SFN without network pre-compensation mode or the HST-SFN with network pre-compensation mode.

4. The method of claim 2, wherein the CSI reporting configuration includes a new reportQuantity that is configured to support the HST scenario.

5. The method of claim 1, wherein the CSI reporting configuration implicitly indicates the HST scenario based on a quasi-co-location (QCL) configuration of CSI-reference signals (CSI-RSs) for a channel measurement resource (CMR).

6. The method of claim 1, wherein the CSI reporting configuration includes a single non-zero power-CSI-reference signal (NZP-CSI-RS) resource set associated with a channel measurement resource (CMR), a first portion of the single NZP-CSI-RS resource set corresponding to the first TRP and a second portion of the single NZP-CSI-RS resource set corresponding to the second TRP of the plurality of TRPs.

7. The method of claim 1, wherein the CSI reporting configuration includes a first non-zero power-CSI-reference signal (NZP-CSI-RS) resource set associated with a channel measurement resource (CMR) and a second NZP-CSI-RS resource set associated with the CMR, the first NZP-CSI-RS resource set corresponding to the first TRP and the second NZP-CSI-RS resource set corresponding to the second TRP of the plurality of TRPs.

8. The method of claim 1, wherein the CSI reporting configuration includes non-zero power-interference measurement resources (NZP-IMRs) or zero-power-IMRs (ZP-IMRs).

9. The method of claim 1, wherein the CSI reporting configuration includes a CSI resource indicator (CRI) configuration that comprises a single CRI being reported, the single CRI being applied to two sets of CSI-reference signal (CSI-RS) resources independently or the single CRI being applied to the two sets of CSI-RS resources using joint encoding.

10. The method of claim 1, wherein the CSI report communication includes at least one of: a single channel quality indicator (CQI), a single rank indicator (RI), a first precoding matrix indicator (PMI) corresponding to the first TRP and a second PMI corresponding to the second TRP of the plurality of TRPs, one layer indicator (LI) corresponding to the first TRP and the second TRP, or a first LI corresponding to the first TRP and a second LI corresponding to the second TRP.

11. The method of claim 1, further comprising encoding a UE capability message that includes a time relaxation value associated with CSI processing in the HST scenario.

12. A user equipment (UE) comprising:
a processor; and
a memory storing instructions that, when executed by the processor, configure the UE to:
in response to being within range of a first transmission and reception point (TRP) of a plurality of TRPs associated with a high speed train (HST), decode a CSI reporting configuration communication received from a network, the CSI reporting configuration indicating that CSI reporting is to be performed in an HST scenario and being configured for the HST scenario;
perform measurements based on the decoded CSI reporting configuration received from the network; and
encode a CSI report communication associated with the HST scenario based on the measurements for transmission to the network,
wherein two sets of CSI-reference signals (CSI-RSs) are associated with a channel measurement resource (CMR), a first set of the two sets of CSI-RSs corresponding to the first TRP and a second set of the two sets of CSI-RSs corresponding to a second TRP, wherein when:
the first set and the second set are configured for HST-single frequency network (HST-SFN) without network pre-compensation mode, the first set is configured to be quasi-co-located to a first set of tracking resource signals (TRSs) with quasi-co-location-Type A (QCL-Type A) and the second set of CSI-RSs is configured to be quasi-co-located to a second set of TRSs with QCL-Type A, and
when the first set and the second set are configured for HST-SFN with network pre-compensation mode, the first set is configured to be quasi-co-located to the first set of TRSs with QCL-Type A and the second set is configured to be quasi-co-located to the second set of TRSs with a special QCL type including at least an average delay and a delay spread.

13. The UE of claim 12, wherein the CSI reporting configuration is configured via radio resource control (RRC) and explicitly indicates the HST scenario.

14. A non-transitory computer-readable storage medium, the computer-readable storage medium including instructions that when executed by a processor of a user equipment (UE), cause the processor to:
in response to being within range of a first transmission and reception point (TRP) of a plurality of TRPs associated with a high speed train (HST), decode a CSI reporting configuration communication received from a network, the CSI reporting configuration indicating that CSI reporting is to be performed in an HST scenario and being configured for the HST scenario;
perform measurements based on the decoded CSI reporting configuration received from the network; and
encode a CSI report communication associated with the HST scenario based on the measurements for transmission to the network,
wherein two sets of CSI-reference signals (CSI-RSs) are associated with a channel measurement resource (CMR), a first set of the two sets of CSI-RSs corresponding to the first TRP and a second set of the two sets of CSI-RSs corresponding to a second TRP, wherein when:
the first set and the second set are configured for HST-single frequency network (HST-SFN) without network pre-compensation mode, the first set is configured to be quasi-co-located to a first set of tracking resource signals (TRSs) with quasi-co-location-Type A (QCL-Type A) and the second set of CSI-RSs is configured to be quasi-co-located to a second set of TRSs with QCL-Type A, and
when the first set and the second set are configured for HST-SFN with network pre-compensation mode, the first set is configured to be quasi-co-located to the first set of TRSs with QCL-Type A and the second set is configured to be quasi-co-located to the second set of TRSs with a special QCL type including at least an average delay and a delay spread.

15. The non-transitory computer-readable storage medium of claim 14, wherein the CSI reporting configuration includes a new information element that indicates whether the CSI reporting configuration is associated with the HST-SFN without network pre-compensation mode or the HST-SFN with network pre-compensation mode.

* * * * *